Sept. 30, 1930.  A. P. BLAESER  1,776,804
TIRE TOOL
Filed Dec. 13, 1928
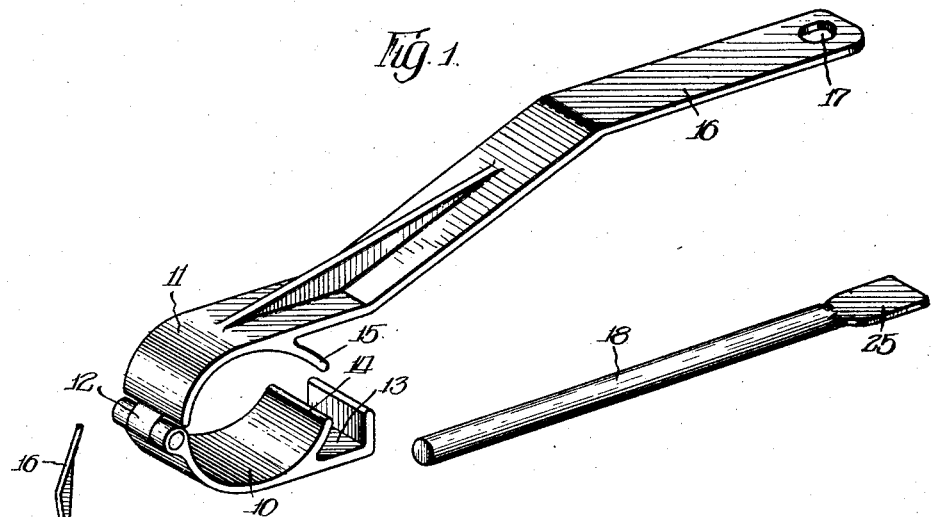
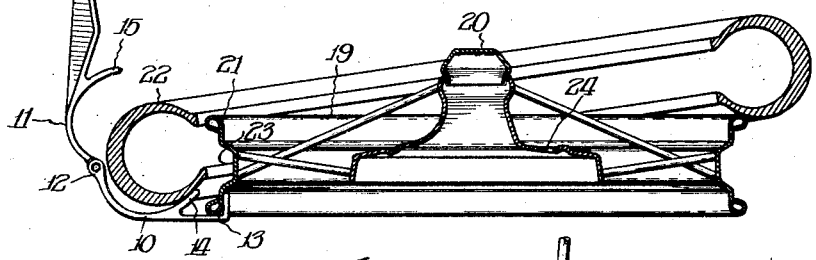
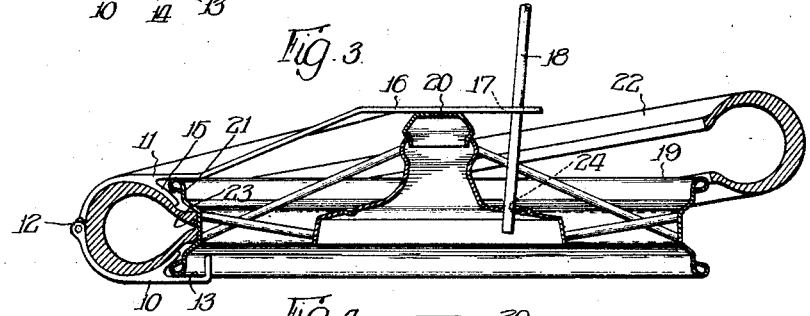
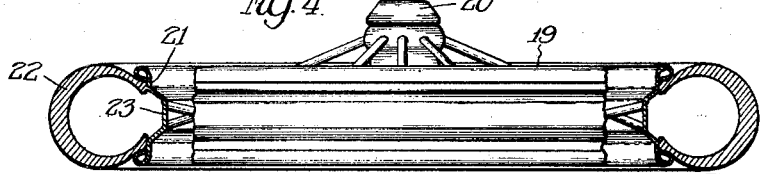
Inventor:
Andrew P. Blaeser,
By Cromwell, Greist & Warden
attys.

Patented Sept. 30, 1930

1,776,804

UNITED STATES PATENT OFFICE

ANDREW P. BLAESER, OF CHICAGO, ILLINOIS, ASSIGNOR TO PIONEER SPECIALTIES COMPANY, OF CHICAGO, ILLINOIS, A CORPORATION OF ILLINOIS

TIRE TOOL

Application filed December 13, 1928. Serial No. 325,702.

The object of this invention is to provide a novel tire tool with which tires may be easily put on or taken off wheels having drop-base rims.

One form of the invention is presented herein for the purpose of exemplification, but it will of course be appreciated that the invention is susceptible of embodiment in other structurally modified forms coming equally within the scope of the appended claims.

In the accompanying drawing:

Fig. 1 is a perspective view of the tool; and

Figs. 2, 3 and 4 are a series of views showing how the tool is used at different stages in putting a tire on a wheel.

The tool shown in the drawing includes two arms 10 and 11 which are hinged together at 12. The arm 10 is relatively short, and is provided with an upwardly opening rim-receiving groove 13 and an upwardly projecting tire-engaging lip 14, which lip advantageously forms one side of the groove 13, while the arm 11 is relatively long, and is provided with a downwardly projecting tire-engaging lip 15 opposite the lip 14 and an upwardly offset handle portion 16 having an opening 17 therein. The opening 17 is for the reception of a leverage bar 18, which bar forms a part of the tool.

The tool is particularly designed for use in connection with wheels having drop-base rims. The precise manner in which the tool is used is clearly illustrated in Figs. 2, 3 and 4. The wheel 19 is placed flat on the ground with the hub cap 20 up. The arms 10 and 11 of the tool are then swung apart, and the short arm 10 of the tool is placed in a radial position under the lower edge of the rim 21 of the wheel at a point adjacent the valve stem aperture, with the lower edge of the rim disposed in the groove 13. The tire 22 to be applied is then placed in a tilted position on the wheel, with the lower side-wall of the tire resting on the lip 14 of the arm 10, and with the valve stem of the inner tube (not shown) positioned in the valve stem aperture in the rim. The arm 11 is then swung downwardly to bring the portions of the side-walls of the tire engaged by the lips 14 and 15 together in the median plane of the rim, in register with the well 23 in the rim, and the bar 18 is passed downwardly through the opening 17 in the arm 11 into one of the bolt apertures 24 in the hub of the wheel and forced laterally in a direction away from the hinged end of the arm 11, thereby causing the tool to shift radially inward with respect to the rim and the portions of the side-walls compressed between the lips 14 and 15 to shift laterally into the well in the rim. The side of the tire diametrically opposite the tool will thus be shifted into a position substantially free of the rim and can be pushed down easily into the median plane of the latter. After the tool has been removed, the upper and lower side-walls of the tire will spring into the seats provided for the same in the upper and lower edges of the rim.

In order to remove the tire from the rim, the above outlined procedure is reversed.

One end of the leverage bar 18 is preferably flattened to provide a blade 25, which blade can be used conveniently as a pry between the rim and the tire in either applying or removing the tire.

I claim:

1. A tire tool for use with wheels having drop-base rims, comprising means for pressing the side-walls of the tire together, and a lever engageable with said means and with the wheel for shifting said means to cause the side-walls compressed thereby to move into the well of a drop-base rim.

2. A tire tool, comprising two hinged arms, one of which is relatively short and is provided with a groove for receiving the lower edge of a rim and a portion for engagement with the lower side-wall of a tire, and the other of which is relatively long and is provided opposite the tire-engaging portion of the short arm with a portion for engagement with the upper side-wall of the tire, and means operable on the long arm to move both arms radially inward with respect to the rim.

3. A tire tool, comprising two hinged arms having portions which are adapted to engage with and press together the side-walls of a tire when the arms are swung together, and a leverage bar which is adapted to engage with one of said arms and fulcrum against a portion of the structure to which the tire is being applied to shift the side-walls of the tire radially inward with respect to the rim.

4. A tire tool, comprising an arm which is adapted to be placed on the ground beneath the rim of a wheel and is provided with a portion for engagement with the lower side-wall of a tire to be applied to the rim, another relatively long arm which is hinged to the first arm and is provided intermediate its ends with a portion for engagement with the upper side-wall of the tire, and means operable on the long arm to move both arms radially inward with respect to the rim.

5. A tire tool, comprising an arm which is adapted to be placed on the ground beneath the rim of a wheel and is provided with a portion for engagement with the lower side-wall of a tire to be applied to the rim, another relatively long arm which is hinged to the first arm and is provided intermediate its ends with a portion for engagement with the upper side-wall of the tire, and a lever engageable with the free end of the long arm and with the wheel to shift both arms radially with respect to the latter.

In witness whereof I have hereunto subscribed my name.

ANDREW P. BLAESER.